United States Patent [19]

Hiramatsu et al.

[11] Patent Number: 4,667,442
[45] Date of Patent: May 26, 1987

[54] CONSTRUCTION OF DOOR FRAME IN MOTOR VEHICLE

[75] Inventors: Eiji Hiramatsu, Aichi; Daiichi Shiraishi, Seto, both of Japan

[73] Assignee: Toyota Jidosha Kabushiki Kaisha, Japan

[21] Appl. No.: 735,061

[22] Filed: May 17, 1985

[30] Foreign Application Priority Data

May 18, 1984 [JP] Japan ............... 59-72944[U]

[51] Int. Cl.⁴ .................................. E06B 7/16
[52] U.S. Cl. .......................... 49/441; 49/374; 49/488; 49/494
[58] Field of Search ......... 49/440, 441, 488, 494, 49/227, 374, 375, 376

[56] References Cited

U.S. PATENT DOCUMENTS

| | | | |
|---|---|---|---|
| 3,068,136 | 12/1962 | Reid | 49/440 X |
| 3,290,826 | 12/1966 | Weimar | 49/440 |
| 3,939,608 | 2/1976 | Asakai et al. | 49/488 |
| 4,089,134 | 5/1978 | Koike | 49/227 |
| 4,284,304 | 8/1981 | Nakamura | 49/440 X |
| 4,409,756 | 10/1983 | Audenino et al. | 49/440 |

FOREIGN PATENT DOCUMENTS 40588 11/1981 European Pat. Off. ........... 49/374

*Primary Examiner*—Philip C. Kannan
*Attorney, Agent, or Firm*—Finnegan, Henderson, Farabow, Garrett & Dunner

[57] ABSTRACT

A construction of a door frame in a motor vehicle, includes a door frame, a door glass, a glass run supported on the door frame, and a core plate connected to the glass run for reinforcement. The glass run has an outer side portion and an inner side portion in sliding contact with an outer surface and an inner surface of the side end edge of a door glass, respectively, and a bottom portion connecting the outer and inner side portions to each other, for vertically slidably guiding the door glass and sealing a space formed between the door glass and the door frame. The outer side portion is disposed such that the outer side portion is exposed to the outside of the vehicle, with respect to the door glass, located at a position where the door glass is shifted toward the outer side portion between the outer side portion and the inner side portion, and the outer surface of the door glass is substantially flush with the outer surface of the door frame.

20 Claims, 6 Drawing Figures

CONSTRUCTION OF DOOR FRAME IN MOTOR VEHICLE

BACKGROUND OF THE INVENTION

1. Field of the Invention

This invention relates to a construction of a door frame in a motor vehicle, and more particularly, improvement in a door frame in a motor vehicle, including a door frame, a door glass, a glass run supported on the door frame, and a core plate connected to the glass run for reinforcing the glass run.

The glass run has an outer side portion and an inner side portion, which are in sliding contact with an outer surface and an inner surface of a side end edge of the door glass. The glass run further includes a bottom portion extending between these outer and inner side portions, for vertically slidably guiding the door glass and sealing a space formed between the door glass and the door frame.

The core plate member provides reinforcement for the glass run.

2. Description of the Prior Art

As shown in FIG. 5 for example, in order to hold a door glass 1 in a motor vehicle and guide the same in a direction of opening or closing of the door glass 1, there is a construction of a door frame having a glass run 3 being of a U-shape in cross section. The glass run 3 is in relatively sliding contact with the inner and outer surfaces of a forward or rear end edge 1A of the door glass 1 in the direction of opening or closing direction of the door glass 1, for guiding the door glass 1 in the direction of opening or closing direction thereof and sealing a space formed between the door glass 1 and the door frame 2.

The above-described construction of the door frame may guide the door glass 1 in the sealed condition and reliably prevent the door glass 1 from being pushed outwardly, i.e. away from the interior of the compartment, due to a difference in pressure between the interior and the exterior of the compartment during running of the motor veichle at high speed.

However, the above-described construction of the door frame presents such a disadvantage that a leg 2A of the door frame 2 is extended further outside of an outer side portion 3A of the glass run 3, which portion 3A is in contact with the outer surface of the door glass 1, so that the glass run is pushed in from outside, and, because of this, a difference h in stage between the outer surface of the door glass 1 and the door frame 2 becomes large.

Such a large difference in stage between the outer surface of the door glass 1 and the door frame 2 presents the disadvantage that the air resistance is increased and the so-called wind whistle is increased during running of the motor vehicle at high speed.

To obviate the above-described disadvantage, as described in West German Pat. No. 2,809,721 for example, there is proposed a construction of a door frame in a motor vehicle, wherein a slider is mounted to the forward or rear end edge of the door glass in a manner to be shifted toward the interior of the compartment, and this slider is guided by a guide integrally with the door frame and opposed to the slider and disposed inside the door glass in a manner to be slidable in the direction of opening or closing of the door glass and be restrained in the direction of the thickness of the door glass.

Furthermore, as shown in European Patent Application Laid-Open No. 0,040,588, there is proposed another construction of the door frame in a motor vehicle, wherein an intermediate support member (slider) being of a generally crank-shape is mounted to a forward or rear end edge of the door glass such that the forward end of intermediate support member is shifted into the compartment from the door glass and projected in parallel to the door glass, and the forward end of this intermediate support member is guided by the glass run in the direction of opening or closing of the door glass.

Either one of these constructions presents the disadvantage that the outer surface of the door glass is made substantially flush with the outer surface of the door frame, so that contribution may be made to the flushness of the vehicle body, however, a slider or a guide is needed, thus raising the manufacturing cost or narrowing the opening area of the door glass by the presence of the slider.

As against the above, as described in Japanese Utility Model Laid-Open (Kokai) No. 65117/1983 (Refer to FIG. 6), there is disclosed a construction wherein an outer side portion 3A of a glass run 3 is covered by core plate member 7 for reinforcing this glass run 3 and an outer surface of the core plate member 7 is directly exposed to the outside of the vehicle body without a door frame 2 being extended outwardly of the core plate member 7.

In this case, since the member on the door frame's side is not doubly provided outwardly of the core plate member 7, the difference in stage between the door glass 1 and the door frame 2 is reduced by a value of thickness of the door frame 2 as compared with the case of FIG. 5.

However, in this cases also, relatively large difference h in stage still remains between the outer surfaces of the core plate member 7 and the door glass 1.

SUMMARY OF THE INVENTION

It is therefore the primary object of this invention to provide a construction of a door frame in a motor vehicle, wherein a difference in stage between the glass and the door frame can be reduced by a simplified arrangement without the use of a member such as a slider.

To this end, the present invention contemplates that, in a construction of a door frame in a motor vehicle, including: a door frame; a door glass, a glass run supported on the door frame and having an outer side portion and an inner side portion in sliding contact with an outer surface and an inner surface of a side end edge of the door glass, respectively, and a bottom portion connecting the outer and inner side portions to each other, for vertically slidably guiding the door glass and sealing a space formed between the door glass and the door frame; and a core plate member connected to the glass run for reinforcing the glass run; the outer side portion is disposed such that the outer side portion is exposed to the outside of the vehicle, with respect to the door glass, the outer side portion is located at a position where the door glass is shifted toward the outer side portion between the outer side portion and the inner side portion, and the outer surface of the door glass is substantially flush with the outer surface of the door frame.

To the above end, the present invention contemplates that the core plate member extends along the outer surface of the door glass on the outboard side of the outer side portion of the glass run and exposed to be outside.

To the above end, the present invention contemplates that the inner side portion of the glass run, the core plate member and the door frame, at the portions which are opposed to the inner surface of a side end edge of the door glass are inclined in a manner to be gradually separated from the inner surface of the side end edge toward the interior of a compartment and the center of the door glass, the portions of the inner side portion and of the core plate member are tightly affixed by a fixing member to an portion of the inner side portion at a position on the side of the compartment of the side end edge, and an inner fin portion is provided on the inner side portion which comes into sealingly sliding contact with the inner surface of the side end edge from the inner side portion and covering the fixing member from outside.

To the above end, the present invention contemplates that the door frame is curved along the forward or rear end edge of the door glass into a generally crank-shape, the glass run is formed into a U-shape in cross section firmly secured at the bottom portion thereof to the door frame through a bolt-nut means, and a projection is projected and extended from the bottom portion of the glass run toward between the forward or rear end edge of the door glass and the bolt-nut means.

To the above end, the present invention contemplates that a door glass weather strip is mounted to a transverse member and an oblique member both of which are disposed at the upper side portion of the door frame. The weather strip includes a top end sealing projection adapted to be clamped between the top end of the door glass and the door frame to seal a space formed therebetween when the door glass is fully closed. The weather strip also includes an inner side sealing projection which is in contact with the inner surface of the door glass.

To the above end, the present invention contemplates that a the glass run is formed of a relatively soft resin, such as rubber and synthetic resin, and manufactured integrally with the metallic core plate member.

According to the present invention, the outer surface of the outer side portion of the glass run is not covered by the door frame. The guide of the outer surface of the door glass is provided only with the outer side portion. In addition, the door glass is displaced toward the outer side portion within the glass run to be substantially flush with the outer surface of the door frame, so that the door glass and the door frame can be flush with each other.

DESCRIPTION OF THE PREFERRED EMBODIMENT

Description will be given of embodiments of the present invention with reference to the drawings.

Figure 1:
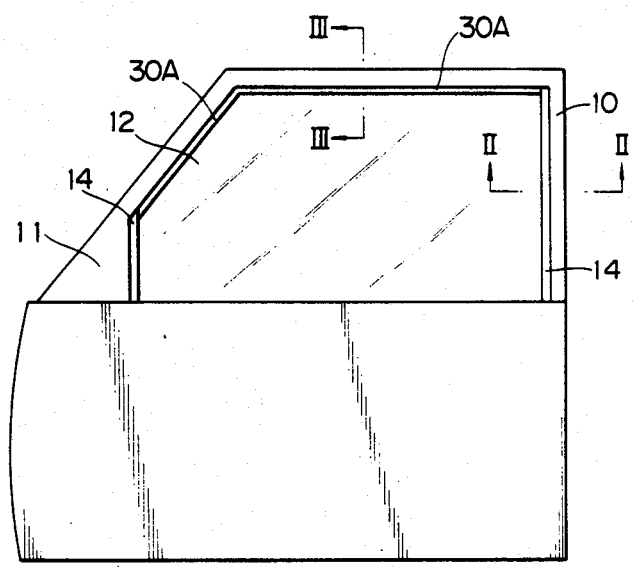
FIG. 1 is a front view showing one embodiment of the construction of the door frame in a motor vehicle according to the present invention.
Figure 2:
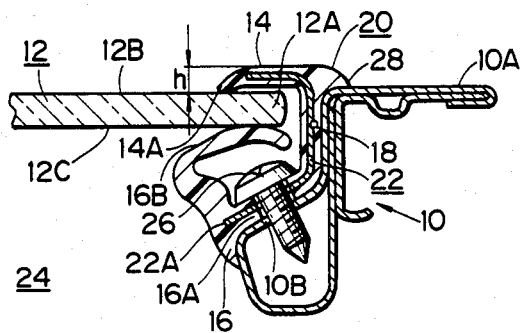
FIGS. 2 and 3 are enlarged sectional views taken along the lines II—II and III—III in FIG. 1, respectively.
Figure 3:
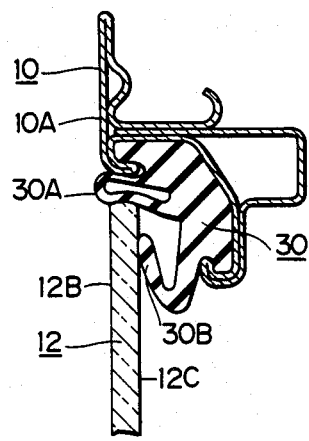

As shown in FIGS. 1 to 3, according to the present invention, a construction of a door frame in a motor veicle includes, a door glass 12, a door frame 10: a glass run 20 supported on the door frame 10, and a core plate member 22 connected to the glass run 20. The glass run 20 contains an outer side portion 14 and an inner side portion 16, which are in sliding contact with an outer surface 12B and an inner surface 12C of a forward or rear end edge 12A of the door glass 12, respectively, and a bottom portion 18 connecting the outer and inner side portion 14 and 16 to each other, for vertically slidably guiding the door glass 12 and sealing a space formed between the door glass 12 and the door frame 10. The core plate member 22 provides reinforcement for the glass run 20. The outer side portion 14 is disposed such that the outer side portion 14 is exposed to the outside of the vehicle. The outer side portion 14 is located at a position where the door glass 12 is shifted toward the outer side portion 14 between the outer side portion 14 and the inner side portion 16. The outer surface 12B of the door glass 12 is substantially flush with the outer surface 10A of the door frame 10.

The inner side portion 16 of the glass run 20, the core plate member 22 and the door frame 10, at the portions which are opposed to the inner surface of a forward or rear side end edge 12A of the door glass 12, are inclined in a manner to be gradually separated from the inner surface of the forward or rear end edge 12A toward the interior of a compartment 24. The center of the door glass 12, inclined portions 16A and 22A of the inner side portion 16 and of the core plate member 22 are tightly fixed through a fixing member, such as tapping screw 26 to an inclined portion 10B of the door frame 10 at a position on the side of the compartment 24 proximate the forward or rear end edge 12. An inner fin portion 16B is provided which seals the sliding contact along the inner surface 12C of the forward or rear end edge 12A from the inner side portion 16, while covering a head of the tapping screw 26 from outside.

As shown in FIG. 2, designated at 14A is an outer fin portion formed on the forward end of the outer side portion 14 for sealing the sliding contact with the outer surface 12B of the forward or rear end edge 12A of the door glass 12.

The glass run 20 includes the outer fin portion 14A and the inner fin portion 16B, which is formed of a relatively soft resin including rubber and synthetic resin. The inner fin portion 16B is manufactured integrally with the metallic core plate member 22 by extrusion, rolling or injection molding.

As shown in FIG. 2, denoted at 28 is a projection smoothly continued along the outer surface 10A of the door frame 10 and integrally formed with the glass run 20 in a manner to seal a space formed between the glass run 20 and the door frame 10.

FIG. 3 shows sections of a transverse member and an oblique member, both of which are disposed at the upper side portion of the door frame 10. Mounted to the door frame 10 is a door glass weather strip 30 having a top end sealing projection 30A adapted to be clamped between the top end of the door glass 12 and the door frame to seal a space formed therebetween when the door glass 12 is fully closed, while an inner side sealing projection 30B being in contact with the inner surface of the door glass. Even in the upper side portion of the door frame 10, the outer surface 10A of the door frame 10 is substantially flush with the outer surface 12B of the door glass 12.

In this embodiment, the door glass 12 is substantially flush with the outer surface 10A of the door frame 10. The outer side portion 14 of the glass run 20 is shifted closer to the outer surface 12B of the door glass 12. Further, the outer side portion 14 of the door glass run 20 provides a seal through the sliding contact with the outer surface 12B of the door glass 12, so that the door glass 12 can be reliable held and guided without permitting the glass run 20 and the core plate member 22 reinforcing the glass run 20 to greatly project outwardly.

Particularly, in this embodiment, as compared with the aforesaid Japanese Utility Model Laid-Open (Kokai) No. 65117/1983, the core plate member 22 is previously assembled in the glass run, so that improvements can be effected in reduction of the number of assembling man-hour, the dimensional accuracy in the direction of door glass thickness and the accuracy of assembling with the door glass 12.

Furthermore, in the above embodiment, the inclined portions 16A, 22A and 10B are formed on the inner side portion 16, core plate member 22 and door frame 10. The inclined portions are firmly secured and integrally connected to one another by the tapping screw 26 and the outer surface of the tapping screw 26 is covered by the inner fin portion 16B integrally extended from the inner side portion 16, so that the operation of assembling the glass run 20 to the door frame 10 is enhanced and the aesthetic appearance thereof can be improved.

Figure 4:
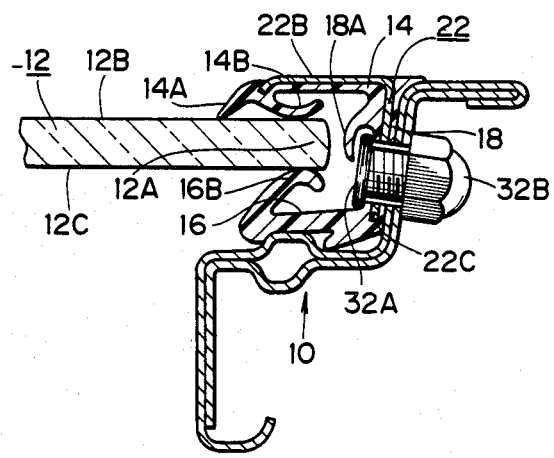
FIG. 4 is a enlarged sectional view showing a second embodiment of the present invention and depicting a portion corresponding to the line II—II in FIG. 1.

Description will hereunder be given of the second embodiment of the present invention with reference to FIG. 4.

In this second embodiment the core plate member 22 is extended along the outer surface 12B of the door glass 12 along the outer side portion 14 of the glass run 20 so that the core plate member 22 is exposed to the outside.

In this case, the core plate member 22 is formed of a bright material such as stainless steel or aluminum so as to additionally function as a decoration.

Further, in this second embodiment, the door frame 10 is curved along the forward or rear end edge 12A of the door glass 12 into a generally crank-shape, while the glass run 20 is formed into a U-shape in cross section firmly secured at the bottom portion 18 thereof to the door frame 10 through a bolt 32A and a nut 32B.

According to the second embodiment, the inclined portion 22A in the first embodiment is dispensed with, and the core plate member 22 essentially comprises the outer side portion 22B and the bottom portion 22C.

In FIG. 4, designated at 18A is a projection extended from the bottom portion 18 of the glass run 20 to thereby prevent the forward or rear end edge 12A of the door glass 20 from directly contacting the bolt 32A.

Furthermore, in this embodiment, a second outer fin portion 14B contacting the outer surface 12B of the forward or rear end edge 12A of the door glass 12 is formed at a position opposite to the outer fin portion 14A provided on the forward end of the outer side portion 14 of the glass run 20.

Since the arrangement to the second embodiment in other respects is identical with the first embodiment, and consequently, same reference numerals are used to designate same or similar parts, a detailed description thereof need not be repeated.

As compared with the first embodiment, this second embdiment is applied to the case where the door frame 10 has little allowance in the direction of the door thickness. Additionally, the second embodiment is applicable to the case where it is desired to give luster to the frame for the design effect.

In the above embodiments, the outer and inner side portions 14 and 16 of the glass run 20 come into sliding contact with the outer and inner surfaces 12B and 12C of the forward or rear end edge 12a of the door glass 12 through the fin portions continuously and integrally fromed on the forward ends of the outer and inner side portions, respectively. However, the present invention need not necessarily be limited to this, and the outer and inner side portions 14 and 16 may directly contact the door glass 12 without providing these fin portions.

Figure 5:
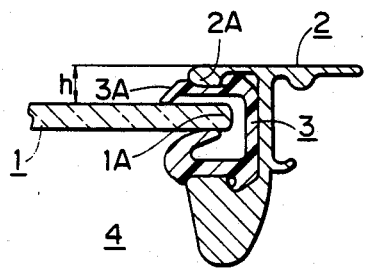
FIG. 5 is a sectional view showing a conventional door frame construction for a motor vehicle.
Figure 6:
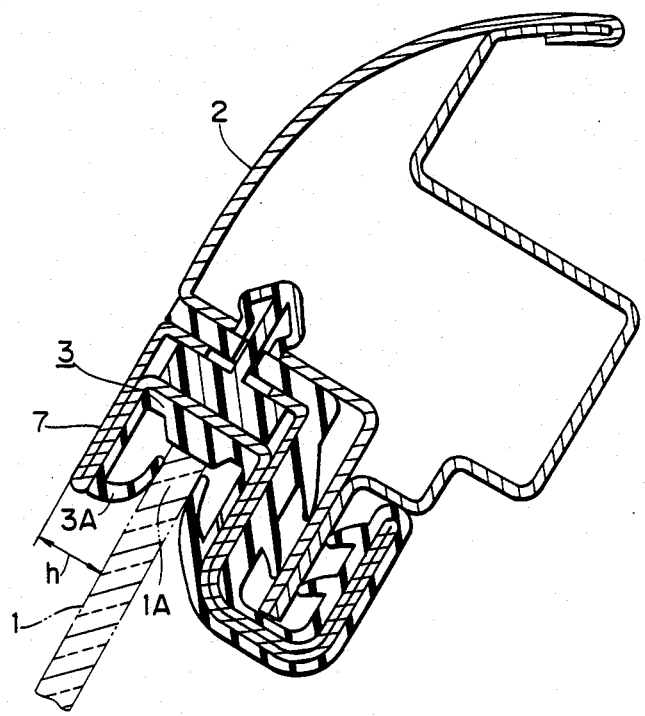
FIG. 6 is a sectional view showing another conventional door frame construction for a motor vehicle.

Furthermore, in the above embodiments, there is described the door frame for guiding the forward or rear end edge 12A of the door glass 12. However, the description may be made on any one if it can guide the side end edge. For example, when a door mirror is mounted to a triangular patch 11 portion in FIG. 1 and so on, the invention is applied only to the rear end edge, while, the forward end edge may have the conventional construction as shown in FIG. 5.

What is claimed is:

1. A construction of a door frame in a motor vehicle, comprising:
    a door frame;
    a glass run supported by said door frame and having an outer side portion and an inner side portion in sliding contact with an outer surface and an inner surface of a side end edge of a door glass, respectively, and a bottom portion connecting said outer and inner side portions to each other for vertically slidably guiding said door glass and sealing a space formed between said door glass and said door frame; and
    a core plate member connected to said glass run for reinforcing said glass run wherein said outer side portion is disposed such that said outer side portion is exposed to the outside of the vehicle with respect to said door glass, said outer side portion is located at a position where said door glass is shifted toward said outer side portion between said outer side portion and said inner side portion, and the outer surface of said door glass is substantially flush with an outer surface of said door frame.

2. The construction of a door frame in a motor vehicle as set forth in claim 1, wherein said core plate member extends along the outer surface of said door glass on the outboard side of the outer side portion of said glass run and exposed to the outside.

3. A construction of a door frame in a motor vehicle as set forth in claim 2, wherein the glass run is formed of a relatively soft resin including rubber and synthetic resin and manufactured integrally with the metallic core plate member.

4. The construction of a door frame in a motor vehicle as set forth in claim 2, wherein the inner side portion of said glass run, said core plate member and said door frame, at the portions which are opposed to the inner surface of the side end edge of said door glass, are inclined in a manner to be gradually separated from the inner surface of said side end edge toward the interior of a compartment and the center of said door glass, said portions of said inner side portion and of said core plate member are tightly affixed by a fixing member to an inclined portion of said inner side portion at a position on the side of the compartments of said side end edge, and an inner fin portion is provided on said inner side portion which comes into sealing and sliding contact with the inner surface of said side end edge from said inner side portion and covering the fixing member.

5. A construction of a door frame in a motor vehicle as set forth in claim 4, wherein the glass run is formed of a relatively soft resin including rubber and synthetic resin and manufactured integrally with the metallic core plate member.

6. The construction of a door frame in a motor vehicle as set forth in claim 4, wherein the door frame is curved along the forward or rear end edge of the door glass into a generally crank-shape, the glass run is formed into a U-shape in cross section and tightenedly fixed at the bottom portion thereof to the door frame through a bolt-nut means, and a projection is projected and extended from the bottom portion of the glass run toward between the forward or rear end edge of the door glass and the bolt-nut means.

7. The construction of a door frame in a motor vehicle as set forth in claim 6, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

8. The construction of a door frame in a motor vehicle as set forth in claim 4, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

9. The construction of a door frame in a motor vehicle as set forth in claim 2, wherein the door frame is curved along the forward or rear end edge of the door glass into a generally crank-shape, the glass run is formed into a U-shape in cross section and tightly affixed at the bottom portion thereof to the door frame through a bolt-nut means, and a projection is projected and extended from the bottom portion of the glass run toward between the forward or rear end edge of the door glass and the bolt-nut means.

10. The construction of a door frame in a motor vehicle as set forth in claim 9, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

11. The construction of a door frame in a motor vehicle as set forth in claim 2, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

12. The construction of a door frame in a motor vehicle as set forth in claim 1, wherein the inner side portion of said glass run, said core plate member and said door frame, at portions which are opposed to the inner surface of the side end edge of said door glass, are inclined in a manner to be gradually separated from the inner surface of said side end edge toward the interior of a compartment and the center of said door glass, said portions of said inner side portion and of said core plate member are tightly affixed by a fixing member to an inclined portion of said inner side portion at a position on the side of the compartments of said side end edge, and an inner fin portion is provided on said inner side portion which comes into sealing and sliding contact with the inner surface of said side end edge from said inner side portion and covering the fixing member.

13. A construction of a door frame in a motor vehicle as set forth in claim 12, wherein the glass run is formed of a relatively soft resin including rubber and synthetic resin and manufactured integrally with the metallic core plate member.

14. The construction of a door frame in a motor vehicle as set forth in claim 12, wherein the door frame is curved along the forward or rear end edge of the door glass into a generally crank-shape, the glass run is formed into a U-shape in cross section and tightly affixed at the bottom portion thereof to the door frame through a bolt-nut means, and a projection is projected and extended from the bottom portion of the glass run toward between forward or rear end edge of the door glass and the bolt-nut means.

15. The construction of a door frame in a motor vehicle as set forth in claim 12, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

16. The construction of a door frame in a motor vehicle as set forth in claim 14, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

17. The construction of a door frame in a motor vehicle as set forth in claim 1, wherein the door frame is curved along the forward or rear end edge of the door glass into a generally crank-shape, the glass run is formed into a U-shape in cross section and tightly affixed at the bottom portion thereof to the door frame through a bolt-nut means, and a projection is projected and extended from the bottom portion of the glass run and between the forward or rear end edge of the door glass and the bolt-nut means.

18. The construction of a door frame in a motor vehicle as set forth in claim 17, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a space formed therebetween when the door glass is fully closed and an inner side sealing projection which is in contact with the inner surface of the door glass.

19. The construction of a door frame in a motor vehicle as set forth in claim 1, wherein a door glass weather strip is mounted to a transverse member and an oblique member both of which are disposed at the upper side portion of the door frame, said door glass weather strip includes a top end sealing projection adapted to be clamped between the top end of the door glass and the door frame to seal a spaced formed therebetween when the door glass is fully closed and an inner side sealing projection which is in contact with the inner surface of the door glass.

20. A construction of a door frame in a motor vehicle as set forth in claim 1, wherein the glass run is formed of a relatively soft resin including rubber and synthetic resin and manufactured integrally with the metallic core plate member.

* * * * *